United States Patent
Arellano et al.

(10) Patent No.: US 7,798,566 B2
(45) Date of Patent: Sep. 21, 2010

(54) MOLDED HEADLINER REINFORCEMENT

(75) Inventors: Nora Arellano, Ann Arbor, MI (US); Mohammed Alawadi, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 293 days.

(21) Appl. No.: 11/957,008

(22) Filed: Dec. 14, 2007

(65) Prior Publication Data
US 2009/0152905 A1 Jun. 18, 2009

(51) Int. Cl.
F16L 3/12 (2006.01)
B60R 13/01 (2006.01)

(52) U.S. Cl. ...................................... 296/214

(58) Field of Classification Search ........... 24/297, 24/453, 458; 296/1.07, 1.08, 97.9, 208, 214, 296/216.08; 174/40 CC, 70 R, 72 A, 535, 174/545; 248/71, 73, 74.1; 403/3, 4, 13, 403/14; 411/508
See application file for complete search history.

(56) References Cited

U.S. PATENT DOCUMENTS

| | | | |
|---|---|---|---|
| 3,210,030 A | | 10/1965 | Ramsey et al. |
| 3,889,320 A | * | 6/1975 | Koscik ...................... 24/297 |
| 5,269,060 A | * | 12/1993 | Dowd et al. ................ 29/897.2 |
| 5,653,410 A | * | 8/1997 | Stroeters et al. ............. 248/73 |
| 5,688,022 A | * | 11/1997 | Adams et al. ............... 296/214 |
| 5,706,559 A | * | 1/1998 | Oliver et al. ................ 267/49 |
| 5,848,456 A | * | 12/1998 | Sjoqvist ..................... 24/618 |
| 5,887,939 A | * | 3/1999 | Yamaguchi et al. ......... 296/210 |
| 5,927,020 A | | 7/1999 | Kobrehel |
| 6,038,764 A | * | 3/2000 | Yamaguchi et al. .......... 29/854 |
| 6,120,091 A | | 9/2000 | Reich et al. |
| 6,311,934 B1 | | 11/2001 | Fujii et al. |
| 6,372,986 B1 | * | 4/2002 | Saeki et al. ................ 174/651 |

(Continued)

FOREIGN PATENT DOCUMENTS

JP 09032972 A * 2/1997

(Continued)

*Primary Examiner*—Glenn Dayoan
*Assistant Examiner*—Paul A Chenevert
(74) *Attorney, Agent, or Firm*—Gifford, Krass, Sprinkle, Anderson & Citkowski, P.C.

(57) ABSTRACT

A headliner reinforcement for ensuring the proper placement of a wire harness at a location above a headliner in a motor vehicle is provided. The headliner reinforcement includes a member having a top side and a bottom side, the bottom side being adjacent to the headliner and the top side being adjacent to a roof of the motor vehicle. The top side includes at least one clip attachment operable to accept at least one clip. In some instances, the top side can include at least two spaced apart clip attachments separated by a predetermined distance and operable to accept at least two spaced apart clips separated by the same predetermined distance on the wire harness. The predetermined distance between the spaced apart clip attachments and the spaced apart clips can be unique among other clip attachments on the motor vehicle and thereby prevent the installment of an undesirable wire harness above the headliner of the motor vehicle. In addition, the predetermined distance between the spaced apart clip attachments and the clips can be unique for the particular model of the motor vehicle, and thereby prevent the installation of a wire harness designed for a different motor vehicle model.

7 Claims, 2 Drawing Sheets

U.S. PATENT DOCUMENTS

| | | | |
|---|---|---|---|
| 6,554,232 B1 * | 4/2003 | Macris | 248/71 |
| 6,652,021 B1 | 11/2003 | Dykman et al. | |
| 6,669,263 B2 * | 12/2003 | Asai | 296/97.9 |
| 6,749,255 B2 | 6/2004 | Dykman et al. | |
| 6,783,624 B2 | 8/2004 | Muehlbacher et al. | |
| 6,799,743 B2 * | 10/2004 | Sawayanagi | 248/27.1 |
| 7,090,284 B2 | 8/2006 | Cowelchuk et al. | |
| 7,100,939 B2 * | 9/2006 | Blake et al. | 280/728.2 |
| 7,318,621 B2 * | 1/2008 | Suzuki et al. | 296/208 |
| 2002/0195844 A1 | 12/2002 | Hipwell | |
| 2003/0011214 A1 | 1/2003 | Gupte et al. | |
| 2004/0007380 A1 * | 1/2004 | Gajewski | 174/72 A |
| 2004/0222673 A1 | 11/2004 | Brown | |
| 2005/0141230 A1 * | 6/2005 | DeLine et al. | 362/494 |
| 2006/0061145 A1 | 3/2006 | Strebe et al. | |
| 2006/0103172 A1 | 5/2006 | Veen et al. | |
| 2007/0089895 A1 * | 4/2007 | Suzuki et al. | 174/72 A |

FOREIGN PATENT DOCUMENTS

JP     11041762 A * 2/1999

* cited by examiner

MOLDED HEADLINER REINFORCEMENT

FIELD OF THE INVENTION

The present invention relates generally to a motor vehicle headliner. More specifically, the invention relates to a wire harness on a molded reinforcement for the headliner of a motor vehicle.

BACKGROUND OF THE INVENTION

Headliners are typically incorporated within a motor vehicle in order to provide a ceiling covering. Some headliners include a molded reinforcement to which a decorative covering can be affixed to. In some instances, a headliner assembly can include the headliner reinforcement which contains hooks, handles, wiring guides and other attachment features that are separately assembled and fixed to the headliner assembly, thereby increasing the cost and complexity of the headliner and subsequent assembly of the motor vehicle.

Typically included above the headliner is wiring that connects various electronic devices such as an overhead lamp, a sunroof control and the like to a power source. The placement of the wiring above the headliner can result in undesirable vibration and/or rattling during the traveling of the motor vehicle on rough road surfaces. In addition, heretofore headliners and headliner reinforcements do not prevent the installation of an undesirable wire harness to the headliner. As such, the attachment of the undesirable wire harness to the headliner can go unnoticed until attachment of the wire harness to electronic devices is attempted. At this time, the undesirable wire harness has to be removed from the headliner and an appropriate wire harness installed in its place. As such, the undesirable vibration and/or rattling results in customer dissatisfaction and the installation of an undesirable wire harness results in increased cost for the manufacturer. Therefore, a headliner reinforcement that affords for the installment of a desirable wire harness and prevents the installment of an undesirable wire harness would be desirable.

SUMMARY OF THE INVENTION

A headliner reinforcement for ensuring the proper placement of a wire harness at a location above a headliner in a motor vehicle is provided. The headliner reinforcement includes a member having a top side and a bottom side, the bottom side being adjacent to the headliner and the top side being adjacent to a roof of the motor vehicle. The top side includes at least one clip attachment operable to accept at least one clip. In some instances, the top side can include at least two spaced apart clip attachments separated by a predetermined distance and operable to accept at least two spaced apart clips separated by the same predetermined distance on the wire harness. The predetermined distance between the spaced apart clip attachments and the spaced apart clips can be unique among other clip attachments on the motor vehicle and thereby prevent the installment of an undesirable wire harness above the headliner of the motor vehicle. In addition, the predetermined distance between the spaced apart clip attachments and the clips can be unique for the particular model of the motor vehicle, and thereby prevent the installation of a wire harness designed for a different motor vehicle model.

The clip attachments can have a top end and a bottom end, the top end and the bottom end being asymmetrical such that a desirable wire harness cannot be installed in an incorrect orientation. In addition, the clip attachment can be located proximate to a front region of the headliner reinforcement. If at least two clip attachments are provided, they can be aligned along a generally horizontal line. The clip attachment can be defined by an aperture, the aperture being at least partially within the top side of the headliner reinforcement member. Operable to attach to the headliner reinforcement with the clip attachment can be a wire harness sheath having an inner cavity for receiving the wire harness and an outer surface having at least one clip separated operable to attach to the clip attachment.

DETAILED DESCRIPTION OF THE INVENTION

The present invention discloses a headliner reinforcement having at least two spaced apart clip attachments operable to accept a wire harness sheath having a wire harness therein. As such, the headliner reinforcement disclosed herein has utility as a component for a motor vehicle.

The headliner reinforcement includes at least one clip attachment that is operable to accept at least one clip located on a wire harness. In some instances, the headliner reinforcement can include at least spaced apart clip attachments that are operable to accept at least two spaced apart clips on a wire harness or a wire harness sheath having the wire harness therein. If more than one clip attachment is provided, the spaced apart clip attachments are separated by a predetermined distance that is equivalent to the distance between spaced apart clips on the wire harness. In this manner, only a wire harness having clips that are spaced apart by an equivalent distance to the distance between the spaced apart clip attachments can be attached to the headliner reinforcement. Thus, in addition to the attachment of the wire harness to the headliner reinforcement preventing undesirable vibration and/or rattling by the wire harness, the headliner reinforcement can prevent the attachment and installation of an undesirable wire harness.

The headliner reinforcement can include a support box for each of the at least one clip attachments, the support box providing reinforcement for a clip attachment and thus a clip attached thereto. In some instances, the at least one clip attachment can be located proximate to a front end of the headliner reinforcement. If a wire harness sheath is included, it can include a clip plate to which a clip is attached thereto. The clip plate is attached to the wire harness sheath and in some instances can be integral with an outer surface of said sheath.

Figure 1:
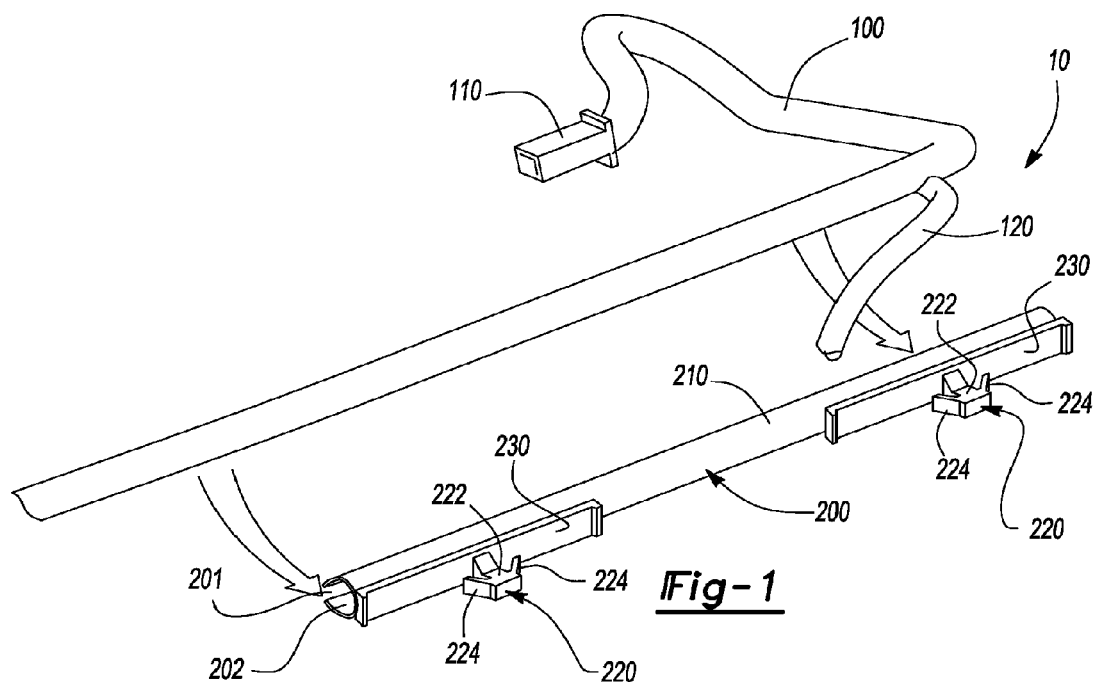
FIG. 1 is a perspective view of a wire harness and a wire harness sheath.
Figure 2:
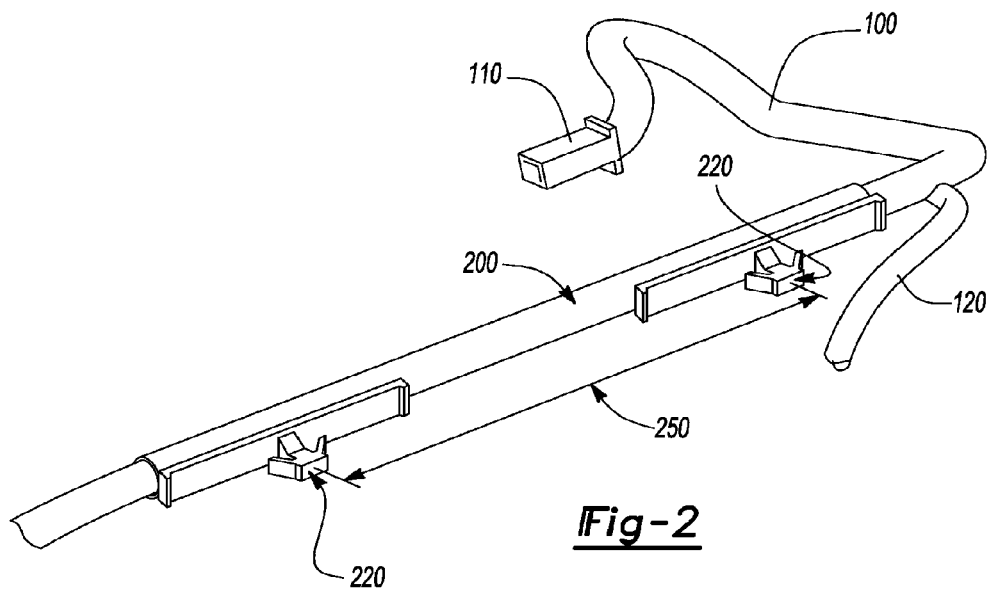
FIG. 2 is a perspective view of the illustration shown in FIG. 1 wherein the wire harness has been inserted within the wire harness sheath.

Turning now to FIGS. 1 and 2, a perspective view of a wire harness and wire harness sheath according to an embodiment of the present invention is shown generally at reference numeral 10. The wire harness assembly 10 can include a wire harness 100, the wire harness 100 having a plug 110 and a wire 120. It is appreciated that the wire harness 100 is made from a plurality of wires which afford for the energizing of electrical devices within the motor vehicle. For example and for illustrative purposes only, the plug 110 can be used to plug into a sunroof control and thereby be used to energize a sunroof electric motor that opens and/or closes the sunroof of the motor vehicle. The wire harness 100 can be located at least partially within a wire harness sheath 200 which has an elongated slit 201 and an inner cavity 202, although this is not required, that is the wire harness 100 itself can have a clip 200 attached thereto. If the sheath 200 is included, it can include an elongated body 210 with at least one clip 220. In some instances, the sheath 200 can include at least two spaced apart clips 220. The clip 220 can be attached to a clip plate 230, the clip plate 230 attached to and extending from the elongated body 210. In some instances, the clip plate 230 is integral with the elongated body 210. The clip 220 can include a clip body 222 and a clip tab 224, the clip body 222 extending from the clip plate 230 in an outwardly direction from the elongated body 210. In addition, the at least two clips 220 are separated by a predetermined distance 250.

Figure 3:
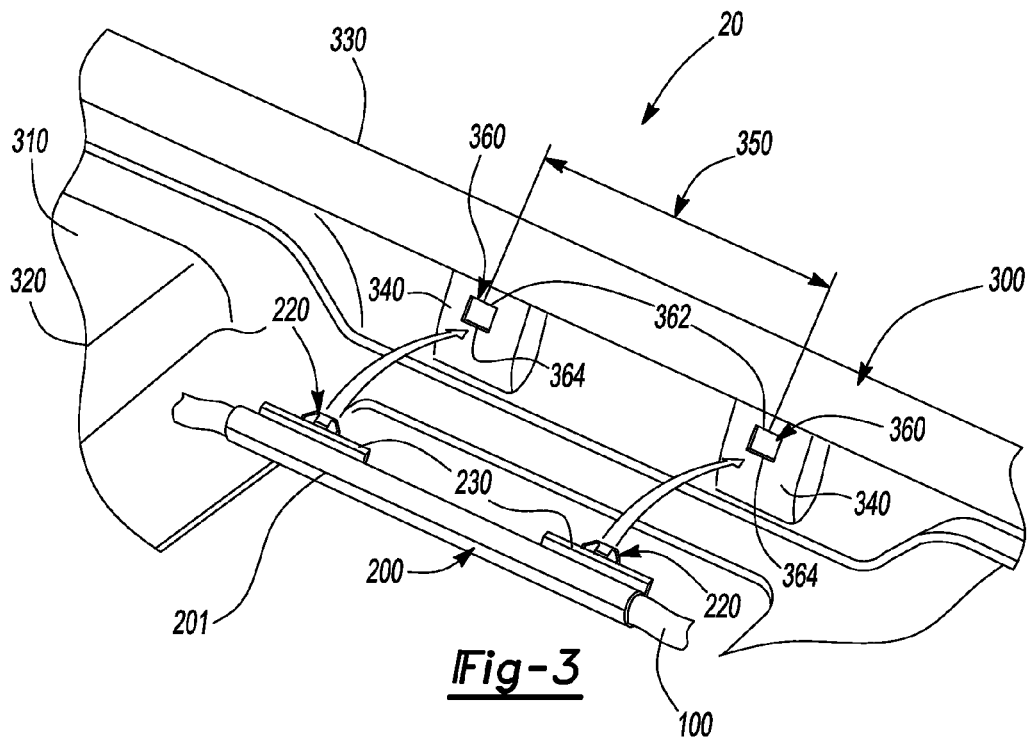
FIG. 3 is a perspective view of a headliner reinforcement having a clip attachment.
Figure 4:
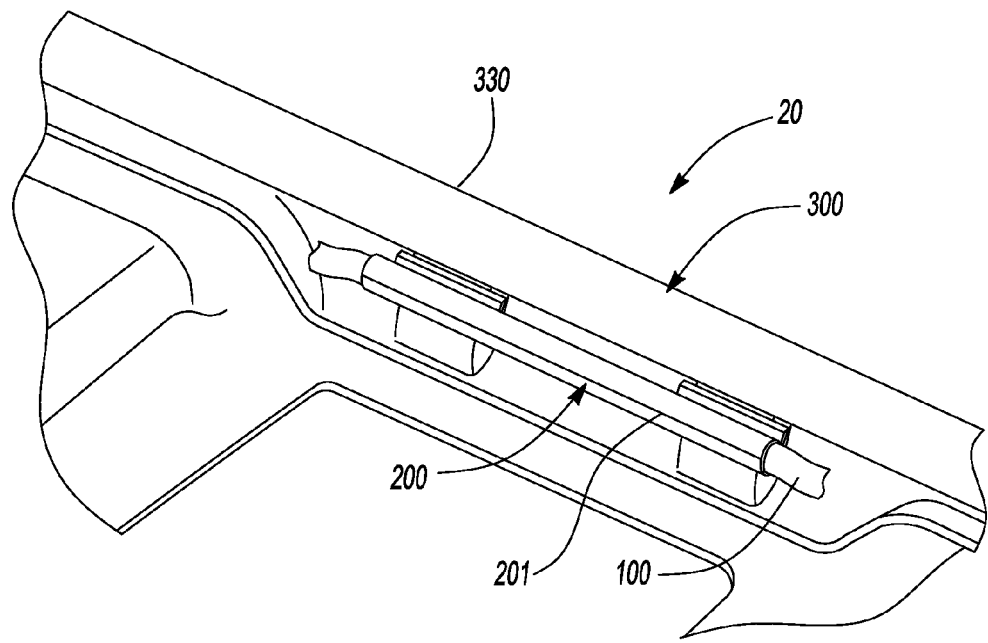
FIG. 4 is a perspective view of the headliner reinforcement shown in FIG. 3 with the wire harness and wire harness sheath shown in FIG. 2 attached thereto.

Turning now to FIGS. 3 and 4, an embodiment of a headliner reinforcement is shown generally at reference numeral 20. The headliner reinforcement 20 has a headliner reinforcement member 300 with a top side 310 and a bottom side 320. It is appreciated that the bottom side 320 can have a headliner attached thereto and the top side 310 can be adjacent to a roof of the motor vehicle. It is also appreciated that between the top side 310 and the roof (not shown) of the motor vehicle items such as wires, wire harnesses, wire harness sheath and the like can be located. In particular, the headliner reinforcement 20 affords for the wire harness 100 to be attached to the top side 310.

The headliner reinforcement member 300 has a front end region 330 which can include at least one clip attachment 360 proximate thereto. A clip attachment 360 can be in the form of an aperture and can also have a top end 362 and a bottom end 364. In some instances, the top end 362 and the bottom end 364 are asymmetrical. For example, a width distance of the top end 362 can be different than a width distance of the bottom end 364. It is appreciated that the clip attachment 360 can be at least partially within the top side 310 and furthermore at least partially within a support box 340. The support box 340 affords for structural support for the clip attachment 360 and the clip 220 attached thereto. In some instances, the headliner reinforcement member 300 can include at least two spaced apart clip attachments 360. It is appreciated that the distance between the at least two clip attachments 360, shown as 350 in FIG. 3, is equivalent to the predefined distance 250 between the at least two clips 220.

As illustrated in FIG. 4, the two spaced apart clips 220 can be attached to the headliner reinforcement member 300. It is appreciated that the attachment of the wire harness 100 to the headliner reinforcement member 300 is afforded by the insertion of the clips 220 at least partially within the clip attachments 360. It is also appreciated that the attachment of the wire harness 100 to the headliner reinforcement member 300 positions the wire harness 100 at a predetermined and specific location relative to the headliner and thus the motor vehicle.

In operation, a headliner reinforcement and a wire harness for a particular model of a motor vehicle have a unique predetermined distance between two clip attachments on the headliner reinforcement and two clips on the wire harness. During assembly of the motor vehicle, and in particular assembly of the headliner, the appropriate wire harness is attached to the headliner reinforcement. If an undesirable wire harness is being installed or attached to the headliner reinforcement, the predetermined distance between the spaced apart clips will not match with the predetermined distance between the spaced apart clip attachments. In this manner, an individual will be alerted that an undesirable wire harness is being installed within the motor vehicle.

The clip attachments can be asymmetrical such that a desirable wire harness cannot be installed in an incorrect orientation. For example, if an individual attempts to install a desirable wire harness in a 180 degree orientation relative to a desired orientation, although the predetermined distance between the clips matches the predetermined distance between the clip attachments, the clips will not insert within the clip attachments. In this manner, the wire harness must be installed in the correct orientation.

A process for making a headliner reinforcement and wire harness assembly that ensures the correct installment of the appropriate wire harness is also included herein. The process includes molding a headliner reinforcement with at least one clip attachment. If the headliner reinforcement has at least two spaced apart clip attachments, the two spaced apart clip attachments have a predetermined distance therebetween. In addition, the predetermined distance between the clip attachments is unique with respect to the particular model of the motor vehicle to be assembled. It is appreciated that the predetermined distance between the clip attachments can also be unique with respect to other clip attachments on the motor vehicle such that a wire harness for the same motor vehicle cannot be attached thereto. The process can also include the manufacture of a wire harness sheath having at least one clip, with spaced apart clips, if included, being separated by a predetermined distance that is equivalent to the distance between the spaced apart clip attachments within the headliner reinforcement.

After manufacture of the headliner reinforcements, the wire harness and the wire harness sheath, the appropriate wire harness can be placed at least partially within the wire harness sheath and attached thereto using any method known to those skilled in the art, illustratively including tape, adhesives, glue, clips, and the like. After assembly of the wire harness within the wire harness sheath, the wire harness assembly is attached to the headliner reinforcement by inserting the at least two spaced apart clips at least partially within the at least two spaced apart clip attachments. In this manner, a process is provided that ensures the proper installment of a desirable wire harness to a desirable headliner reinforcement and the prevention of undesirable rattling, vibration and the like. It is also appreciated that the accurate placement of the wire harness relative to the headliner reinforcement ensures that proper connection of the wiring to desirable electrical devices is assured.

It is to be understood that various modifications are readily made to the embodiments of the present invention described herein without departing from the spirit and scope thereof. Accordingly, it is to be understood that the invention is not to be limited by the specific illustrated embodiments, but by the scope of the appended claims.

We claim:

1. A headliner reinforcement assembly having an elongated body and a clip attachment for ensuring the proper placement of a wire harness at a location above a headliner in a motor vehicle, said headliner reinforcement assembly comprising:

a wire harness assembly having a wire harness and a wire harness sheath, said wire harness sheath having an elongated body with an inner cavity and a longitudinal slit, said longitudinal slit dimensioned for said wire harness to be placed within said inner cavity of said elongated body, said wire harness sheath also having a pair of spaced apart clip plates extending from said elongated body and a pair of spaced apart clip bodies separated by a predetermined distance and extending from said spaced apart clip plates in an outwardly direction from said elongated body; and a headliner reinforcement having a top side, said top side having two spaced apart clip attachments spaced apart by said predetermined distance;

said pair of spaced apart clip bodies of said wire harness sheath attached to said pair of spaced apart clip attachments of said headliner reinforcement.

2. The headliner reinforcement assembly of claim 1, wherein said clip attachment has a top end and a bottom end, said top end and said bottom end being asymmetrical, for the purpose of preventing attachment of said wire harness to said headliner reinforcement in an incorrect orientation.

3. The headliner reinforcement assembly of claim 1, wherein said two spaced apart clip attachments are located proximate to a front region of said headliner reinforcement.

4. The headliner reinforcement assembly of claim 1, wherein said two spaced apart clip attachments are aligned along a generally horizontal line.

5. The wire harness assembly of claim 1, wherein said pair of spaced apart clip plates are integral with said wire harness sheath.

6. The headliner reinforcement assembly of claim 1, further comprising a support box for each of said two spaced apart clip attachments.

7. The headliner reinforcement assembly of claim 6, wherein each of said two spaced apart clip attachments is an aperture, each of said apertures at least partially within one of said support boxes of said headliner reinforcement member.

* * * * *